United States Patent [19]
Gluf, Jr.

[11] Patent Number: 5,855,229
[45] Date of Patent: Jan. 5, 1999

[54] SOLENOID MANIFOLD ASSEMBLY

[75] Inventor: Carl G. Gluf, Jr., Chesterfield, Mich.

[73] Assignee: Lectron Products, Inc., Rochester Hills, Mich.

[21] Appl. No.: 619,941

[22] Filed: Mar. 18, 1996

[51] Int. Cl.⁶ .................................................. F16K 11/00
[52] U.S. Cl. ...................... 137/884; 285/124.1; 411/531
[58] Field of Search ................................... 137/884, 550,
137/269; 251/367; 285/174, 137.1, 124.1,
124.4, 124.5; 411/383, 546, 531

[56] References Cited

U.S. PATENT DOCUMENTS

| | | | |
|---|---|---|---|
| 3,214,195 | 10/1965 | Zahuranec et al. | 285/124.1 X |
| 4,238,165 | 12/1980 | Wagner | 411/546 X |
| 4,678,006 | 7/1987 | Northman et al. | |
| 4,934,411 | 6/1990 | Albrecht | 137/884 |
| 5,054,982 | 10/1991 | Freeman | 411/383 X |
| 5,086,803 | 2/1992 | Hohejima | 137/884 X |

*Primary Examiner*—John Fox
*Attorney, Agent, or Firm*—Harness, Dickey & Pierce, P.L.C.

[57] ABSTRACT

A sandwich solenoid manifold assembly is provided which includes a steel plate having a plurality of fluid passages formed therethrough, a plastic manifold including a plurality of worm passages formed in a lower surface thereof and a plurality of insert receiving holes provided therein. The lower surface of the plastic manifold being connected to the steel plate. A plurality of steel inserts are inserted in the through holes in the plastic manifold, the steel inserts having a first end provided with a radial flange which abuts against a surface of the plastic manifold and a second end which abuts against the steel plate. The sandwich solenoid manifold assembly is less expensive to manufacture in comparison with conventional die cast solenoid manifolds.

9 Claims, 2 Drawing Sheets

SOLENOID MANIFOLD ASSEMBLY

BACKGROUND OF THE INVENTION

1. Field of the Invention

The present invention relates to a solenoid manifold assembly. More particularly, the present invention relates to a sandwich solenoid manifold assembly including a steel plate and a plastic manifold having worm passages in a surface thereof and a plurality of insert receiving holes provided therethrough for receiving a plurality of steel inserts having a first end provided with a radial flange which abuts against a surface of the plastic manifold and a second end which abuts against the steel plate.

2. Description of Background Art

Virtually all complex hydraulically-controlled automotive transmissions are now equipped with a solenoid manifold which includes a plurality of solenoid valves that can be selectively actuated for providing hydraulic fluid to the clutches, brakes and other hydraulically actuated components of the hydraulically controlled automotive transmission in order to obtain a plurality of transmission gear ratios. Conventionally, die-cast type solenoid manifolds have been used in the art. These die-cast type solenoid manifolds generally include a plurality of worm passages provided on a surface of the die-cast solenoid manifold. This surface of the die-cast solenoid manifold is designed to be mounted to a corresponding interface of a hydraulically controlled automotive transmission.

The interface of the hydraulically controlled automotive transmission includes a plurality of input and output fluid passages which correspond with said plurality of worm passages in the manifold. A plurality of solenoid valves are disposed on the die-cast solenoid manifold in order to open or close the fluid passages defined by the worm passages formed in the first surface of the solenoid manifold. The opening and closing of the fluid passages generally provides fluid or shuts off fluid supplied for engaging or disengaging transmission clutches. The fluid supplied through the fluid passages may also be utilized for actuating other hydraulically actuated components in the hydraulic lines of the hydraulically controlled automotive transmission.

The conventional die-cast solenoid manifold designs were heretofore the primary design for solenoid manifolds because the die-cast solenoid manifolds are capable of withstanding the greater than 1500 p.s.i. which is utilized in a hydraulically controlled transmission of an automotive vehicle.

A problem with the die-cast solenoid manifolds is that they are very complicated and expensive to manufacture. A large factor in the high cost of die-cast solenoid manifolds is that each die-cast solenoid manifold requires several post machining operations. In addition, the dies required for manufacturing the die-cast solenoid manifolds are complex in design and are also very expensive.

Another problem with conventional die-cast solenoid manifolds is that they are very heavy. It is a growing trend in the automotive industry to reduce the total weight of a vehicle. The goal of weight reduction is driven in large part by increased governmental standards on fuel economy.

It is therefore desirable to provide a manifold assembly having a low overall cost, requires no post machining operations, provides a reduction in weight and increases the ability to place solenoid valves independent of customer interface requirements.

SUMMARY OF THE INVENTION

Accordingly, it is an object of the present invention to provide a sandwich solenoid manifold assembly for use with a hydraulically controlled transmission which includes a plastic manifold portion and which can withstand the high fluid pressure of a hydraulically controlled transmission.

It is a further object of the present invention to provide a sandwich solenoid manifold assembly for use with a hydraulically controlled transmission which includes a plastic manifold portion and a steel plate in a stacked relationship for interfacing with the hydraulically controlled transmission It is still another object of the present invention to provide a solenoid manifold assembly for use with a hydraulically controlled transmission which has a low overall cost relative to the cost of a conventional die-cast solenoid manifold.

It is another object of the present invention to provide a solenoid manifold assembly for use with a hydraulically controlled transmission which requires no post machining operations.

It is yet another object of the present invention to provide a solenoid manifold assembly for use with a hydraulically controlled transmission with increased ability to place solenoid valves independent of customer interface requirements.

It is yet another object of the present invention to provide a solenoid manifold assembly for use with a hydraulically controlled transmission which is reduced in weight in comparison to conventional die-cast solenoid manifold assemblies.

It is still another object of the present invention to provide a solenoid manifold assembly for use with a hydraulically controlled transmission which is simple in structure, easy to mass produce, and durable in use.

These and other objects of the present invention are obtained by providing a solenoid manifold assembly, comprising: a steel plate having a plurality of fluid passages formed therethrough; a plastic manifold including a plurality of insert receiving holes provided therethrough and a first surface having a plurality of fluid passages formed therein, said first surface of said plastic manifold opposing said steel plate; and a plurality of steel inserts inserted in said insert receiving holes in said plastic manifold, said steel inserts having a first end provided with a radial flange which abuts against a surface of said plastic manifold and a second end which abuts against said steel plate. The plastic manifold in combination with the steel inserts and the steel plate allow the sandwich solenoid manifold assembly of the present invention to replace conventional die-cast solenoid manifolds. In other words, the steel plate along with a plurality of steel manifold inserts absorb the high pressure exerted on the solenoid manifold assembly, thus permitting a plastic manifold to be utilized in this high pressure environment.

The ability to use a plastic manifold in place of the conventional die-cast solenoid manifold assembly results in a substantial cost savings. The combined cost of the sandwich solenoid manifold assembly according to the present invention is estimated to result in approximately a 33% cost reduction in comparison to the high cost of die casting solenoid manifolds.

In addition, the present invention contributes to vehicle weight reduction by replacing conventional heavy die-cast solenoid manifold assemblies with a relatively thin steel plate and a light weight plastic manifold.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only and thus are not limitative of the present invention, and wherein.

DETAILED DESCRIPTION OF THE PREFERRED EMBODIMENTS

Figure 1:
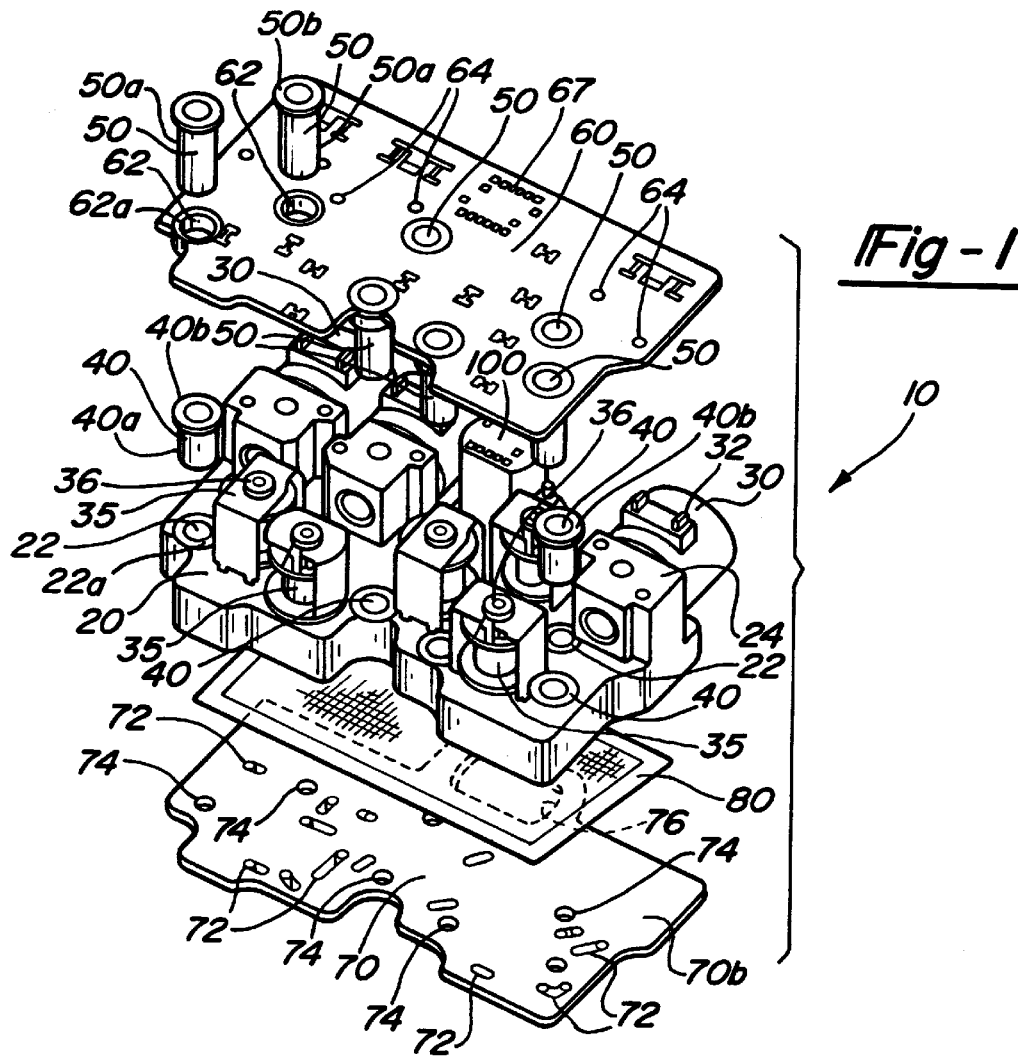
FIG. 1 is an exploded perspective view of a disassembled sandwich solenoid manifold assembly according to the principles of the present invention.

The present invention relates to a sandwich solenoid manifold assembly 10 for use with a hydraulically controlled automotive transmission. With reference to FIG. 1, the main elements of the sandwich solenoid manifold assembly 10 will be described.

The sandwich solenoid manifold assembly 10 includes a plastic manifold 20. The plastic manifold 20 has a lower surface 20a (illustrated in FIGS. 3 and 4) which is connected to a steel plate 70. A plastic lead frame 60 is connected to an upper surface of the plastic manifold 20. An elastomer filter seal 80 is provided between the plastic manifold 20 and the steel plate 70.

Figure 3:
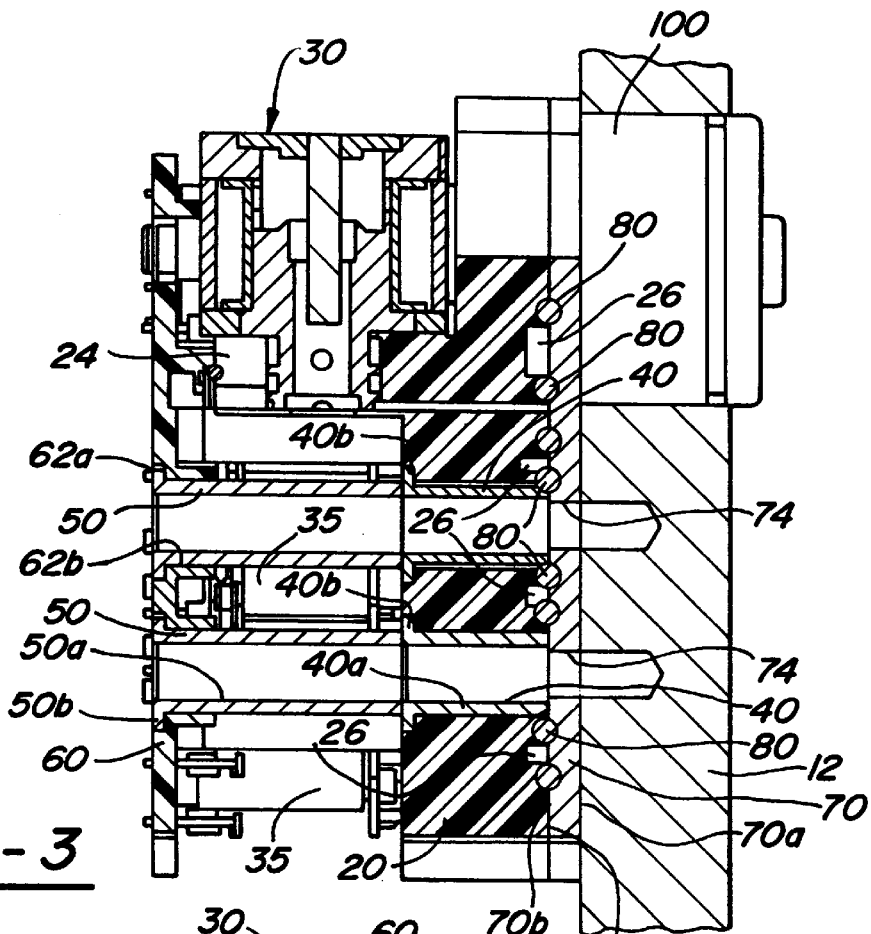
FIG. 3 is a sectional view of the sandwich solenoid manifold assembly taken along lines 3—3 of FIG. 2.

In use, the sandwich solenoid manifold assembly 10 would be affixed to an automatic transmission device 12, as shown in FIG. 3, and disposed in the oil sump chamber of the transmission. The automatic transmission device 12 has a plurality of threaded bores 14 for receiving fasteners, not shown, for fastening the sandwich solenoid manifold assembly 10 to the transmission 12.

The plastic manifold 20 includes a plurality of insert receiving holes 22. The insert receiving holes 22 are provided with a radially recessed upper rim portion 22a. A plurality of lower steel inserts 40 are inserted in the insert receiving holes 22 of the plastic manifold 20. The lower steel inserts 40 are provided with a cylindrical body portion 40a and a radially extending flange portion 40b at an upper portion thereof. The radially extending flange portion 40b of each lower steel insert 40 is seated in a radially recessed upper rim portion 22a of the insert receiving holes 22. As will be described herein, the lower steel inserts 40 receive a bolt therethrough for fastening the sandwich solenoid manifold assembly 10 to the transmission 12. The steel inserts are designed to absorb the forces from mounting the sandwich solenoid manifold assembly 10 to the transmission 12 and thereby allows the use of a plastic manifold 20.

The plastic manifold 20 optionally includes a plurality of integrally formed upward extending portions 24 for receiving solenoid valves 30 in a horizontal direction relative to the lower surface 20a of the plastic manifold 20. The plastic manifold 20 is also provided with a plurality of holes for receiving solenoid valves 35 in a vertical direction relative to the lower surface 20a of the plastic manifold 20. The solenoid valves 30, 35 can be of the ON/OFF or variable force type. An example of a ON/OFF and a variable force solenoid valve suitable for use in the present invention are disclosed in U.S. Pat. No. 4,678,006 issued to Northman et al. on Jul. 7, 1987, which is herein incorporated by reference.

The solenoid valves 30 and 35 cooperate with worm-type fluid passages 26 provided in the lower surface 20a of the plastic manifold 20. The solenoid valves 30, 35 operate to open and close the fluid passages defined by the worm-type fluid passages 26 which communicate with corresponding input and output passages (not shown) of a hydraulically controlled automotive transmission 12.

Figure 4:
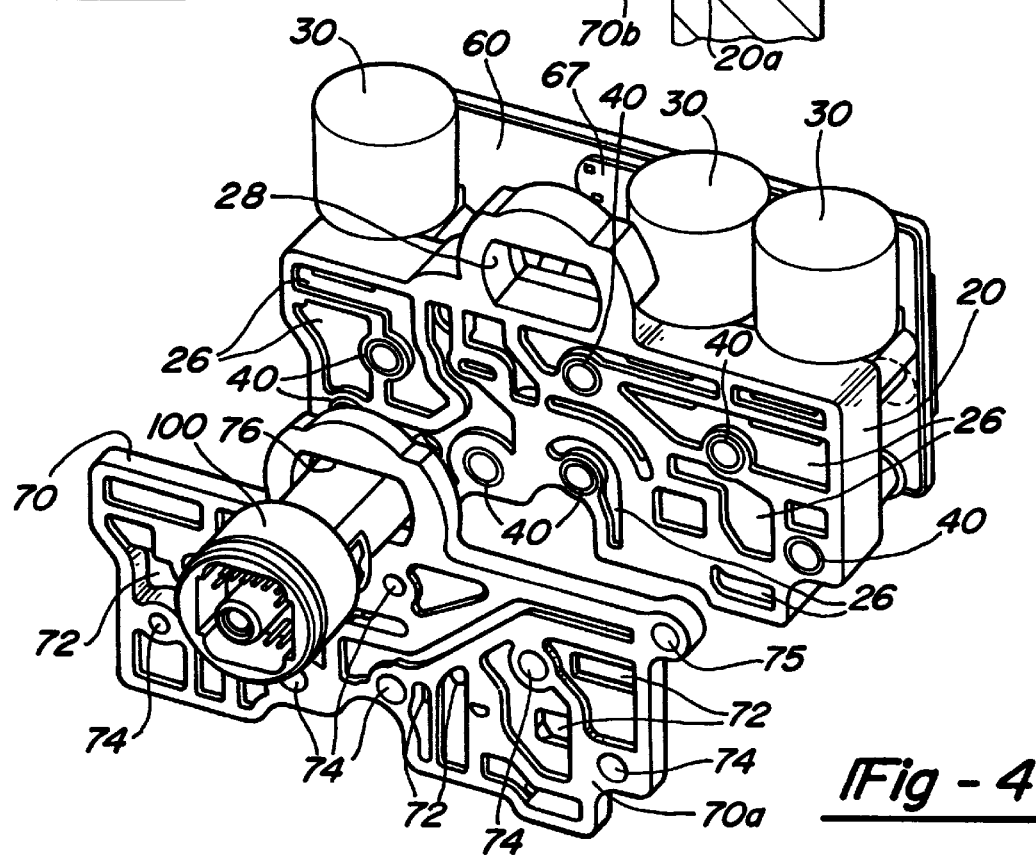
FIG. 4 is an exploded perspective view of a disassembled sandwich solenoid manifold assembly illustrating the lower surfaces of the plastic manifold and steel plate.

FIG. 4 is a perspective view of the lower surface 20a of the plastic manifold 20 and the steel plate 70. As mentioned above, the lower surface 20a of the plastic manifold 20 includes a plurality of worm-type fluid passages 26. The worm-type fluid passages 26 are referred to as worm-type passages because they often have the appearance of worm tunnels. However, the worm-type fluid passages 26 can be of any configuration such as straight, curved or angled channels and do not have to have the appearance of worm tunnels. The worm-type fluid passages 26 shown in FIG. 4 are merely an illustration of how the worm-type fluid passages are formed in the plastic manifold 20. The specific configuration of the worm-type fluid passages 26 is dependent upon the configuration of the fluid inlets and outlets of the automotive transmission.

Figure 2:
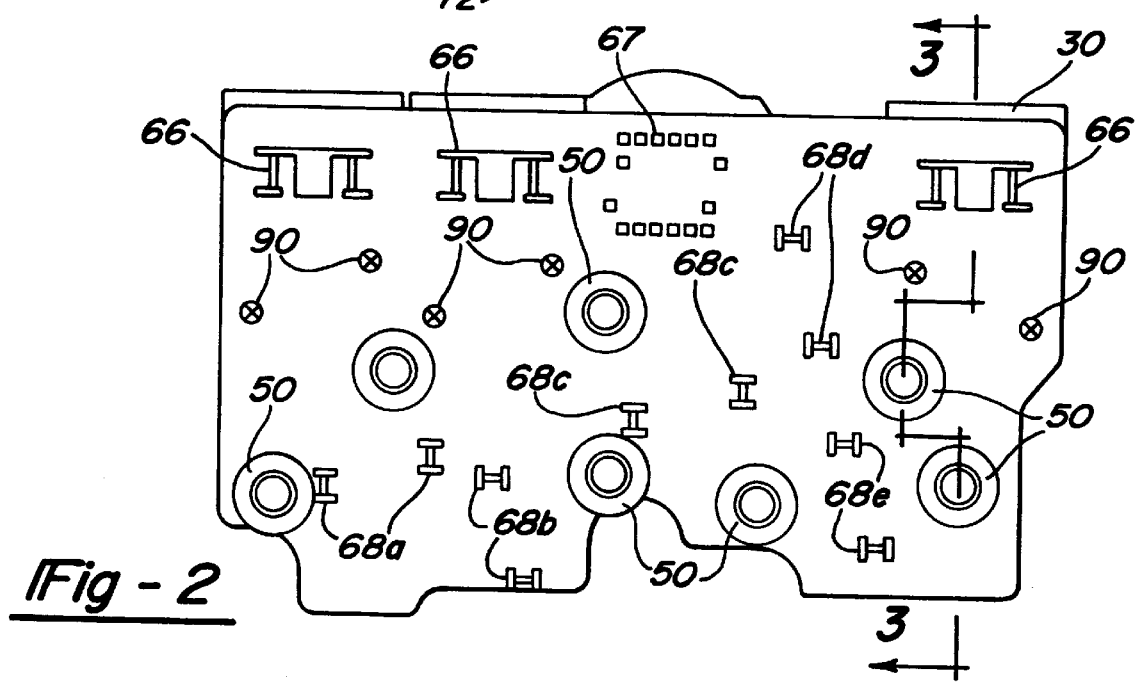
FIG. 2 is a top plan view of the sandwich solenoid manifold assembly according to the principles of the present invention.

Each of the upward extending portions 24 of the plastic manifold 20 are provided with screw receiving holes 24a which are provided for securing the plastic lead plate 60 to the plastic manifold 20. The plastic lead plate 60 is provided with a plurality of holes 64 corresponding with the screw receiving holes 24a in the upward extending portions 24 of the plastic manifold 20. A plurality of screws 90 are inserted in the holes 64 in order to secure the plastic lead plate 60 to the plastic manifold 20, as shown in FIG. 2.

The plastic lead plate 60 includes a plurality of insert receiving holes 62. Each insert receiving hole 62 is provided with a radially recessed upper rim portion 62a at an upper edge thereof and a cylindrical wall portion 62b, as shown in FIG. 3.

A plurality of upper steel inserts 50 are inserted into the insert receiving holes 62 of the plastic lead frame 60. The upper steel inserts 50 include a cylindrical body portion 50a and a radially extending flange portion 50b. The radially extending flange portion 50b is received in the radially recessed upper rim portion 62a of the insert receiving holes 62 of the plastic lead frame 60. A lower surface of the cylindrical body portion 50b of the upper steel inserts 50 abut against the radial flange portion of the lower steel inserts 40 inserted in the plastic manifold 20. The relationship between the upper steel inserts 50, the lower steel inserts 40 and the steel plate 70 is best shown in the cross sectional view of FIG. 3. A fastener, not shown, is received through the lower and upper steel inserts 40, 50, respectively for fastening the sandwich solenoid manifold assembly 10 to the transmission 12.

The steel plate 70 includes a transmission interface surface 70a, as shown in FIG. 4. The transmission interface surface 70a interfaces with an interface surface of the hydraulically controlled transmission 12. The steel plate 70 also includes a plastic manifold interface surface 70b which opposes the lower surface 20a of the plastic manifold 20. A plurality of fluid passages 72 are provide through said steel plate 70 which correspond with the input and output fluid passages of the hydraulically controlled automotive transmission 12 and the worm-type fluid passages 26 of the plastic manifold 20. The transmission interface surface 70a of the steel plate 70 is optionally provided with recessed portions in the vicinity of the fluid passages 72, as shown in FIG. 4. The recessed portions are provided for increasing the fluid flow through the fluid passages 72. The steel plate 70 is also provided with a plurality of fastener receiving holes 74 which receive the fasteners which extend through the upper and lower steel inserts 50, 40, respectively, for fastening the sandwich solenoid manifold assembly 10 to the transmission 12. As an additional feature, the steel plate 70 can optionally be provided with fastener holes 75, as shown in FIG. 4, which are exterior of the plastic manifold 20.

The elastomer filter seal 80 which is provided between the lower surface 20a of the plastic manifold 20 and the plastic manifold interface surface 70b of the steel plate 70 includes a seal around each of the worm-type fluid passages 26 of the lower surface 20a of the plastic manifold 20, as shown in FIG. 3. In addition, the elastomer filter seal 80 provides a meshed screen filter for the fluid passing between the fluid passages 72 of the steel plate 70 and the worm-type fluid passages 26 of the plastic manifold 20.

Because the sizes of the fluid passages 72 and the worm-type fluid passages 26 can be increased irrespective of the size of the input and output passages of the hydraulically controlled automotive transmission interface, the size of the filtered passage between the steel plate and the plastic manifold can be increased.

When assembled, the manifold assembly must withstand pressures greater than 1500 p.s.i.. Thus, the lower and upper steel inserts 40, 50 are provided for absorbing the forces of the hydraulic fluid while mounting the plastic manifold 20 and plastic lead frame 60 to a hydraulically controlled transmission interface.

With reference to FIG. 2, five pairs of electrical connector portions 68a–68e are provided on the plastic lead frame 60 for providing electrical contact with the electrical contact portions 36 of the solenoid valves 35. In addition, electrical connectors 66 are provided on the plastic lead frame 60 for connecting to the electrical connectors 32 of the solenoid valves 30, as shown in FIG. 1. An electrical connecting portion 67 is also provided on the plastic lead frame 60 for connecting with the main electrical connector 100 as shown in FIG. 4.

The main electrical connector 100 engages with an electrical outlet of an automotive transmission control system in order to provide electrical signals from the transmission to the electrical connectors 66, 68a–68e of the plastic lead frame 60. The associated transmission structure would be configured to permit the electrical connector 100 to be exposed to the exterior of the transmission to permit an associated electrical connector to be attached thereto. In the preferred embodiment shown in FIGS. 1–4 the steel plate 70 is provided with an opening 76 through which the main electrical connector 100 is received. The plastic manifold 20 is also provided with a corresponding opening 28 through which the main electrical connector 100 is received.

FIG. 3 illustrates the stacking relationship of the upper and lower steel inserts 50, 40 and the steel plate 70 relative to the transmission 12. FIG. 3 also illustrates how the solenoid valves 30 are horizontally mounted in the upward extending portions 24 of the plastic manifold 20.

It is noted that it would not be a departure from the scope of the present invention to provide steel inserts only through the plastic manifold for holding the plastic manifold in place. In other words, the upper steel inserts 50 could be eliminated from the preferred embodiment without departing form the scope of the present invention. In addition, the specific steel insert design may be modified to include a cylinder and a separate washer configuration or a conical or stepped shaped configuration. In addition, the inserts 40, 50 can be formed of other high strength materials other than steel. Further, it is noted that the plastic manifold 20 and steel plate 70 could also be formed of alternative materials such as ceramics or other metals.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A solenoid manifold assembly, comprising:

a steel plate having a plurality of fluid passages formed therethrough;

a plastic manifold including a plurality of fluid grooves formed in a first surface thereof and a plurality of insert receiving holes provided therein, said first surface of said plastic manifold being connected to said steel plates so that said grooves provide fluid communication between fluid passages in the steel plate;

a plurality of hollow steel inserts inserted in said through holes in said plastic manifold, said hollow steel inserts having a first end provided with a radially outwardly extending flange which abuts against a surface of said plastic manifold and a second end which abuts against said steel plate; and a plurality of threaded fasteners extending through said plurality of hollow inserts to secure the steel plate to the plastic manifold.

2. The solenoid manifold assembly according to claim 1, further comprising at least one solenoid valve provided on said plastic manifold.

3. The solenoid manifold assembly according to claim 1, further comprising at least one solenoid valve provided on said plastic manifold.

4. The solenoid manifold assembly according to claim 3, further comprising a leadframe attached to said plastic manifold for providing electrical connections to said at least one solenoid valve.

5. The solenoid manifold assembly according to claim 4, wherein said leadframe includes a plurality of insert receiving holes therethrough which correspond to said insert receiving holes in said plastic manifold.

6. The solenoid manifold assembly according to claim 5, further comprising a plurality of hollow steel inserts each having a first end with a radially extending flange which abuts against a surface of said leadframe and a second end which abuts against said first end of a corresponding steel insert received in said insert receiving hole of said plastic manifold.

7. The solenoid manifold assembly according to claim 5, wherein said leadframe is made of plastic.

8. A solenoid manifold assembly, comprising:

a plate member having a plurality of fluid passages formed therethrough;

a manifold member including a plurality of insert receiving holes provided therethrough and a first surface having a plurality of fluid grooves formed therein, said first surface of said manifold member being connected to said plate member so that said grooves provide fluid communication between fluid passages in the plate member;

a plurality of hollow inserts inserted in said insert receiving holes in said manifold member, said hollow inserts having a first end provided with a radially outwardly extending flange which abuts against a surface of said manifold member and a second end which abuts against said plate member; and a plurality of threaded fasteners inserted through said plurality of hollow inserts to secure the plate member to the manifold member.

9. The solenoid manifold assembly according to claim 8, further comprising at least one solenoid valve provided on said manifold member.

\* \* \* \* \*